G. D. GRIFFITHS.
ONE REVOLUTION CLUTCH.
APPLICATION FILED MAY 6, 1912.

1,064,683.

Patented June 10, 1913.

Witnesses.

Inventor.

UNITED STATES PATENT OFFICE.

GUY DESMOND GRIFFITHS, OF ACME, ALBERTA, CANADA.

ONE-REVOLUTION CLUTCH.

1,064,683. Specification of Letters Patent. Patented June 10, 1913.

Original application filed October 5, 1911, Serial No. 653,020. Divided and this application filed May 6, 1912. Serial No. 695,525.

*To all whom it may concern:*

Be it known that I, GUY DESMOND GRIFFITHS, a subject of the King of Great Britain, residing at Acme, in the Province of Alberta, Dominion of Canada, have invented certain new and useful Improvements in One-Revolution Clutches, of which the following is a specification.

My invention relates to improvements in one-revolution clutches, and the object of my invention is to design certain clutch mechanism which will be brought into action at certain times so that power may be transmitted from one shaft to another shaft, particularly for the purpose of turning said second shaft one revolution, as hereinafter more particularly explained.

This present application, (case B) is a division from the parent application for improvements in grain-shockers, filed October 5, 1911 under Ser. No. 653,020.

It must be understood that the said clutch mechanism is capable of general application.

Figures 1, 2:
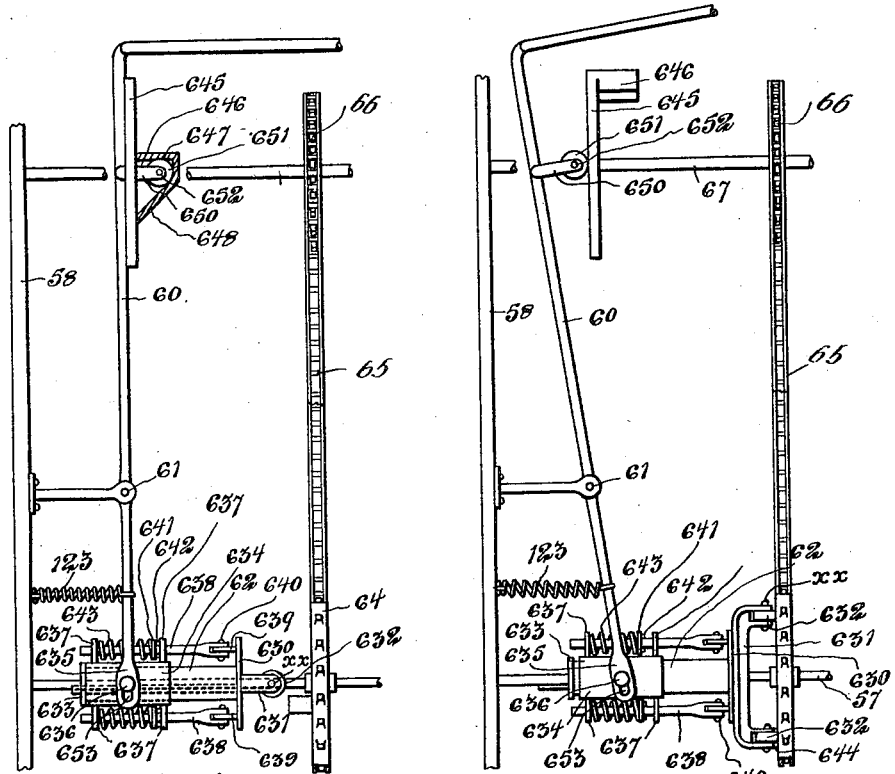
Figure 3:
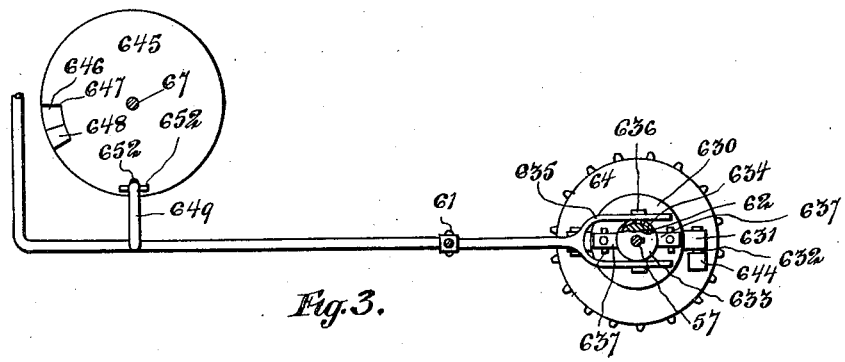

Figure 1 is a plan view of the clutch showing the same out of engagement with its associated sprocket wheel. This figure also shows a plan view of means, partly in section, whereby the clutch is held in engagement with its associated sprocket wheel at certain times. Fig. 2 is a view similar to Fig. 1, except that the clutch is shown in engagement with its associated sprocket wheel, and Fig. 3 is a side elevation of the parts illustrated in Fig. 2, with certain parts removed.

In the drawings, like characters of reference indicate corresponding parts in each figure.

Although this clutch mechanism is capable of general application, and I shall so describe it, still it is designed to be particularly used in connection with the improvements in grain shockers disclosed in the said parent application.

57 is a driven shaft, which I shall hereinafter refer to as the second shaft, and this second shaft is journaled in suitable bearings 58, one only of which is shown.

60 is a clutch-rod which normally occupies the position illustrated in Fig. 1. When it is desired to transmit energy from the second shaft 57 to the first shaft 67, the clutch-rod 60 is moved outward by any suitable mechanism or part thereof around its pivot bearing 61 in which it is supported. This bearing 61 is carried by one of the bearings 58 and it should be suitably constructed to permit the clutch rod 60 to describe an arc when moved.

62 is any suitable friction-clutch member splined on the shaft 57. This friction clutch member is integrally provided with a plate 630 and the bracket 631 in the ends of which are journaled the rollers 632 by the pins *x x*. The said clutch member is provided at one end with a collar 633. This clutch member rotates with the shaft 57, and mounted on said clutch member is a sleeve 634. The forked end 635 of the rod 60 straddles the sleeve 634 and is pivoted thereto by the screws 636, as illustrated particularly in Fig. 3.

637 are lugs carried in pairs by each side of the sleeve 634 and mounted in each pair of these lugs is a rod 638 in the outer end of which is journaled a roller 639 by the pins 640. The rods 638 are preferably square in cross section where they operate through the said lugs and fit correspondingly-shaped holes so as to prevent axial movement of these rods in order that the rollers 639 may always properly co-act with the plate 630. Mounted on each of the said rods is a washer 641, and between these washers and their immediately-associated lugs 637 is an ordinary split pin or other suitable means 642. Mounted on each of the said rods and between the washers 641 and the pair of lugs to the left thereof is a coiled-spring 643. These springs keep the rollers 639 in contact with the plate 630.

64 is a sprocket wheel loosely mounted on the shaft 57, and this sprocket wheel is provided on its side adjacent the plate 630, with a pin or stud 644.

Keyed to the shaft 67 is a disk 645 provided with a pocket 646 provided with a horizontal wall 647 and an inward slanting wall 648.

649 is an arm provided with a horizontal extension 650 in the outer end of which is journaled a roller 651 by the pin 652. When the parts are in the position illustrated in Fig. 1, the roller 651 occupies the position illustrated within the pocket 646. When the clutch-rod 60 is moved as described, the roller 651 is moved out of the pocket 646, and the friction-clutch member 62 is moved through the medium of the sleeve 634 and its connected parts, to position either of the rollers 632 so that as said friction clutch member is rotated either one will come in contact with the pin or stud 644 and so rotate the sprocket wheel 64. The shaft 57 is always rotating when the machine is in use, and consequently when the friction clutch member 62 is moved as described to lock the sprocket wheel 64 loosely journaled on the shaft 57, to said shaft, energy is conveyed by the sprocket chain 65 to the sprocket wheel 66 keyed to the shaft 67 journaled in the bearing 58. The movement of the shaft 67 of course moves the disk 645 keyed thereto, and so positions the pocket 646 in relation to the roller 651 as to prevent the roller occupying this pocket until the said shaft has made a complete revolution. 123 is a spring connecting the clutch rod 60 with the bearing 58. So soon as the said shifting means for the clutch rod 60 moves out of engagement with the same the said pocket 646 will be positioned in the path of movement of the roller 651, and consequently the said spring 123 will force the clutch rod 60 into the position illustrated in Fig. 1. This movement of the clutch rod will bring the sleeve 634 in contact with the collar 633 and so will withdraw the clutch member 62 and its connected parts until the rollers 632 are free to revolve without engaging the pin or stud 644, and consequently the shaft 67 and its connected parts will come to rest. When the sleeve 634 is moved into the position illustrated in Fig. 2, the springs 643 are under increased compression and therefore they insure the snug engagement of the rollers 639 with the plate 630, and the roller 632 with the pin or stud 644. The face or side of the sprocket wheel 64 carrying the pin or stud 644 will be constructed so as to provide a flat surface for the rollers 632 to travel over. The slanting wall 648 of the pocket 646 permits the ready withdrawal and entry of the roller 651 in respect of said pocket without jarring. Where the screws 636 pass through the forked end 635 of the clutch rod 60, are provided slots 653 to prevent binding.

The use of the spring-controlled rods 638 with the clutch member 62 will prevent the rollers 632 from conflicting with the pin or stud 644 when the parts occupy the position illustrated in Fig. 1. These parts also prevent any undue strain coming on the clutch rod 60, as any movement of said clutch rod beyond that necessary to clutch the wheel 64 to the shaft 57 will be absorbed by the springs 643.

The disk 645 and the roller 651 co-acting therewith provide positive means whereby the shaft 67 is moved one revolution through power transmitted from the shaft 57.

What I claim as my invention is:

1. A one-revolution clutch comprising the combination of a first and second shaft; bearings therefor; a sprocket-wheel loosely journaled on said second shaft provided with a stud; a clutch member splined on said second shaft and provided near one end with a vertically-disposed plate; a sleeve mounted on said clutch member; spring-controlled rods mounted in supports carried by said sleeve, and each provided in its outer end with a roller journaled therein, each roller designed to operate against said plate; spring-controlled shifting means whereby said sleeve and clutch member are moved along said second shaft at certain times to clutch said sprocket wheel thereto, and means mounted on said first shaft whereby as said shifting means is moved, as described, said sprocket wheel will be clutched to said second shaft while said first shaft makes a complete revolution.

2. A one-revolution clutch comprising the combination of a first and second shaft; bearings therefor; a sprocket-wheel loosely journaled on said second shaft provided with a stud; a clutch member splined on said second shaft and provided near one end with a vertically-disposed plate; a sleeve mounted on said clutch member; spring-controlled rods mounted in supports carried by said sleeve, and each provided in its outer end with a roller journaled therein, each roller designed to operate against said plate; spring-controlled shifting means whereby said sleeve and clutch member are moved along said second shaft at certain times to clutch said sprocket wheel thereto; a disk mounted on said first shaft and provided with a pocket, and means carried by said shifting means designed to co-act with said disk at certain times whereby said shifting means forces said clutch member and its connected parts to clutch said sprocket wheel to said second shaft, as set forth and for the purpose specified.

3. A one-revolution clutch comprising the combination of a first and second shaft; bearings therefor; a sprocket wheel loosely journaled on said second shaft provided with a stud; a clutch member splined on said second shaft and provided near one end with a vertically-disposed plate; a bracket carried by said clutch member in each end of which is journaled a roller; a sleeve mounted on said clutch member; spring-controlled rods mounted in supports carried by said sleeve and each provided in its outer end with a roller journaled therein, each roller designed to operate against said plate; spring-controlled shifting means whereby said sleeve and clutch member are moved along said second shaft at certain times to clutch said sprocket wheel thereto, and means mounted on said first shaft whereby, when said shifting means is moved as described, said sprocket wheel will be clutched to said second shaft while said first shaft makes a complete revolution.

4. In a one-revolution clutch, the combination of a first and second shaft; bearings therefor; means for operating said second shaft; a sprocket wheel loosely journaled on said second shaft; a spring-controlled lever; a support for said lever; a clutch member splined on said second shaft to which said lever is pivoted; means for operating said arm to clutch said sprocket wheel to said second shaft by moving said clutch member; means for transmitting energy from said second-mentioned shaft to said first shaft, and a member keyed to said first-shaft and co-acting with said arm whereby said sprocket wheel is clutched to said second shaft long enough to permit said first shaft to be turned one revolution.

In testimony whereof I have affixed my signature in presence of two witnesses.

GUY DESMOND GRIFFITHS.

Witnesses:
HAROLD VILLERS BISHOP,
JOHN KERSHAW.

---

Copies of this patent may be obtained for five cents each, by addressing the "Commissioner of Patents, Washington, D. C."